United States Patent [19]
Dalabakis et al.

[11] 3,747,106
[45] July 17, 1973

[54] NAVIGATION SYSTEM UTILIZING PLURAL COMMERCIAL BROADCAST TRANSMISSIONS

[75] Inventors: Eli James Dalabakis, Seminole; Harry Douglas Shearer, Petersburg, both of Fla.

[73] Assignee: Electronic Communications, Inc., St. Petersburg, Fla.

[22] Filed: July 1, 1971

[21] Appl. No.: 158,860

[52] U.S. Cl............ 343/112 D, 324/82, 343/112 R
[51] Int. Cl............................................. G01s 11/00
[58] Field of Search................... 343/112 D, 112 R; 324/82; 331/1 A

[56] References Cited
UNITED STATES PATENTS
3,076,192  1/1963  Brown et al............. 343/112 D UX
3,742,492  3/1966  Honoré et al................... 343/112 D

*Primary Examiner*—Benjamin A. Borchelt
*Assistant Examiner*—Richard E. Berger
*Attorney*—Sandoe, Hopgood & Calimafde

[57] ABSTRACT

A radio navigation, position locating and signaling arrangement employs three operative channels for receiving three commercial radio transmissions. Each channel includes feedback circuitry for maintaining a constant phase relationship between a replica of the received broadcast carried and a reference oscillation, both reduced in frequency. An accumulator in each channel records the number of pulses added and/or deleted from the reference pulse train to provide a measure of the radial distance travelled by a vehicle with respect to the corresponding fixed radio transmitters. Position information may then be derived from the three radial measurements.

7 Claims, 10 Drawing Figures

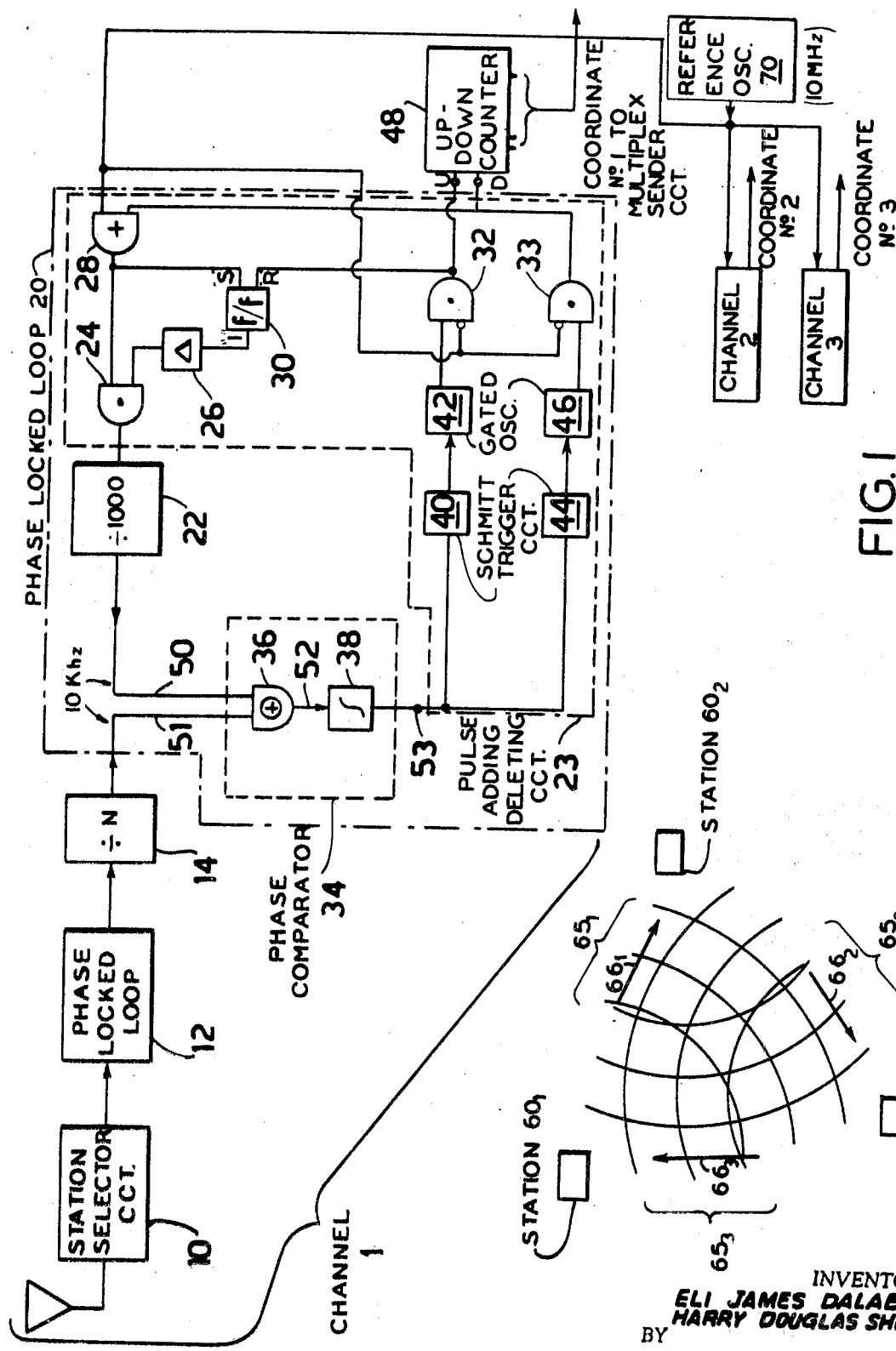

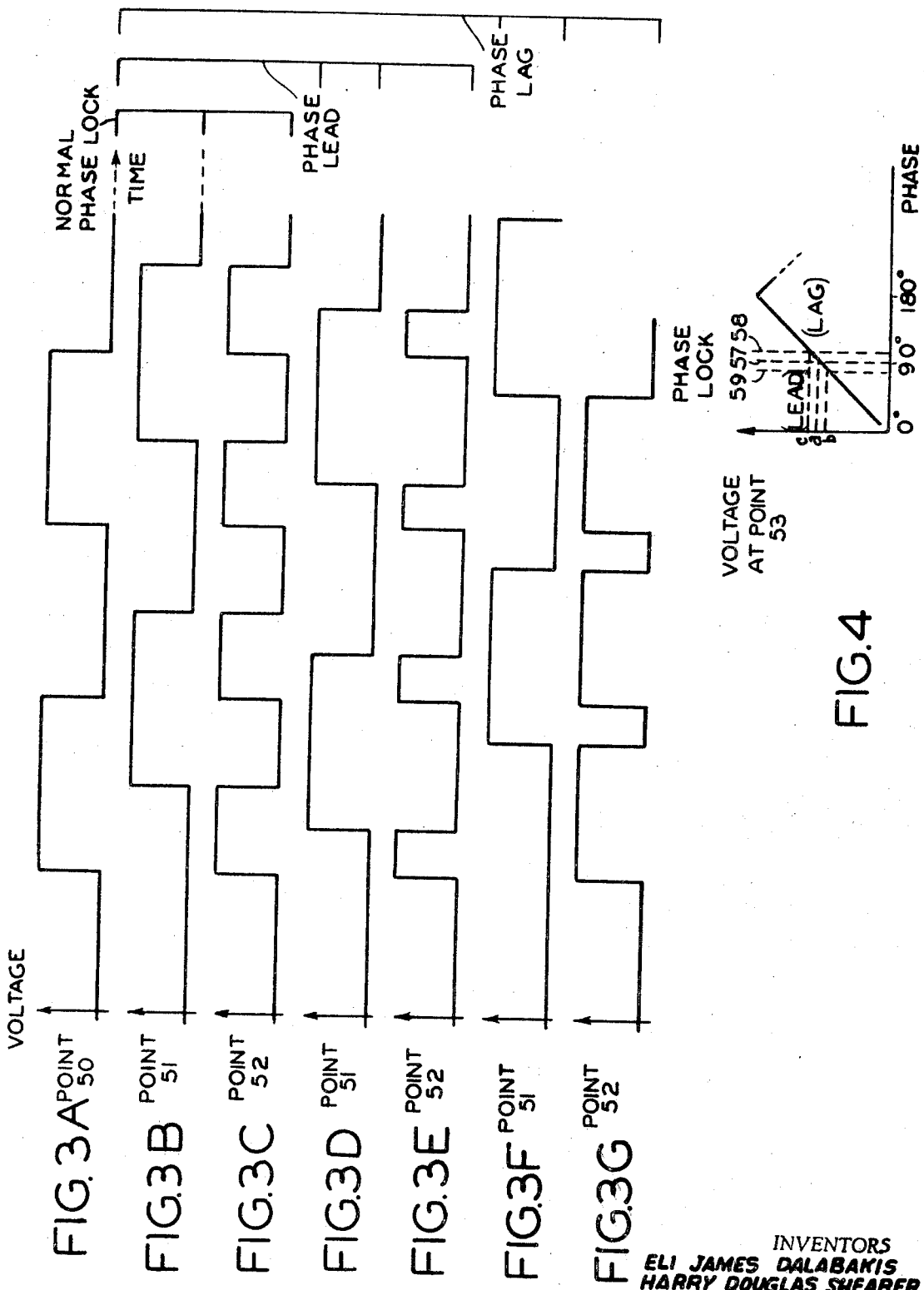

NAVIGATION SYSTEM UTILIZING PLURAL COMMERCIAL BROADCAST TRANSMISSIONS

This invention relates to electronic navigation apparatus and, more specifically, to a system for determining the position of a vehicle utilizing commercial radio broadcast transmissions.

Several systems have heretofore been implemented which permit a vehicle to determine its position via the use of special radio transmissions. Such systems typically operate over a broad territorial expanse and include, for example, LORAN which employs physically spaced master and slave pulse transmitting stations. A vehicle determines its position by making electrical pulse delay measurements, essentially utilizing a hyperbolic intersection process. However, LORAN and other such systems inherently require a corresponding frequency spectrum allocation.

It is an object of the present invention to provide a radio navigation, position locating system which does not contribute to the already crowded radio frequency spectrum.

More specifically, an object of the present invention is the provision of a radio position locating arrangement which utilizes signals provided by commercial broadcasting.

The above and other objects of the present invention are realized in a specific, illustrative radio position locating arrangement which employs three channels, each tuned to a different radio station. In each channel, the incoming carrier is divided down to a selected frequency, e.g., 10 Khz, as in the output of a local reference oscillator of fixed frequency.

The two 10 Khz signals are supplied as inputs to a phase detector which is responsive to the changing phase relationship which obtains as the vehicle moves with respect to the three fixed transmitting stations. The output of the phase detector causes pulses to be added to or deleted from the reference oscillator pulse train to maintain the two 10 Khz in a predetermined phase relationship.

A running net total of added and/or deleted pulses is accumulated to provide a measure of the vehicle's movement in one coordinate direction from its starting point. The accumulations of all three channels defines the total displacement of the vehicle and, if the starting point is known, its position.

The locator arrangment may thus be employed, for example, in an urban or suburban environment for scheduling purposes, i.e., to maintain the real time disposition of a fleet of vehicles, such as taxis, transit or emergency vehicles, trucks, or the like. Similarly, the arrangement may be employed for pleasure boat position location or to determine the situs of emergency situations. It is a non-cooperative system requiring no changes to existing commercial broadcast stations.

The above and other features and advatnages of the present invention will become more clear from the following detailed description of an embodiment thereof, presented hereinbelow in conjunction with the accompanying drawing, in which:

FIG. 1 illustrates in block diagram form a radio navigation, position locating arrangement embodying the principles of the present invention;

FIG. 2 depicts the loci of constant phase signals emitted by three radio stations;

FIG. 3A–3G are timing diagrams depicting voltage waveforms appearing at selected circuit positions in FIG. 1 under varying phase conditions; and FIG. 4 depicts the transfer characteristic for a phase comparator of FIG. 1.

Referring now to FIGS. 1 and 2, there is shown a position monitoring system wherein the postion of a vehicle, having the locator apparatus of FIG. 1, is determined through the use of three local standard broadcast transmissions, e.g., those emitted by three spaced AM radio stations $60_1$ through $60_3$. Each station emits modulated carrier signals wherein the loci of constant phase for any transmission are concentric circles about the transmitter station. Thus, for example, the circle segments $65_1$ are lines of constant signal phase for emissions from the station $60_1$, this signal having a gradient of maximum phase change in the radial direction $66_1$. Correspondingly, the phase loci $65_2$ and $65_3$ for the stations $60_2$ and $60_3$, along with the concomitant phase gradients $66_2$ and $66_3$ are also shown in FIG. 2. The phase loci 65 thus in essence form a coordinate grid network in the geographical area between the stations $60_1$ through $60_3$.

In accordance with the basic aspects of the present invention, a vehicle which operates in the grid is supplied with receiver apparatus having three channels 1–3 for receiving the carrier signals emitted by the corresponding stations $60_1$ through $60_3$. As the vehicle moves from a known starting point in the grid, the phase change of each received radio carrier is monitored. As more fully described hereinbelow, the net phase change data accumulated for each of the three received carrier signals unambiguously defines the change in position for the vehicle relative to its starting point.

With reference to FIG. 1, the vehicle location equipment includes three similar channels 1–3, channel 1, illustrative of the other receiver channels, being shown in detail. With respect to channel 1, a station selector circuit 10 is tuned to receive a corresponding radio transmission, e.g., the AM signal emitted by a local commercial station $60_1$. The received AM program is then supplied to a phase locked loop 12 which isolates the carrier of the received signal, discarding its modulation products. The phase locked loop 12 also converts the output to digital form. Embodiments for the phase locked loop 12 are commercially available and are readily apparent to those skilled in the art. The carrier may alternatively be isolated by a sharply tuned radio frequency bandpass filter in the selector circuit 10, a limiter or saturating amplifier being used to convert the sinusoidal carrier to digital form.

The received carrier wave is reduced in frequency by a digital divider network 14. Since all AM broadcast stations have a carrier frequency which is an integral multiple of 10 Khz, 10 Khz becomes a convenient output for the divider 14 in each channel. Thus, for the AM station, N assumes a number between 55 and 160 based upon the frequency of the associated station. Modulo N counters for any N are well within the skill of the art, either by directly cascading counter modules, or by feedback gating to eliminate excess count states.

Correspondingly, a reference oscillator 70 common to all channels is employed, and emits an output wave having an output frequency which is an integral multiple of 10 Khz, e.g., 10 Mhz. The oscillator output pulses quiescently pass through a pulse adding-deleting circuit 23 described hereinbelow to a divide-by-1,000 network 22 which thus furnishes a 10 Khz output wave.

The two 10 Khz pulse trains, present at the circuit points 50 and 51, are maintained in a predetermined phase relationship by the action of a composite phase locked loop circuit 20. It will be seen from FIG. 2 that when the vehicle has a component of displacement in the direction of the vector $66_1$ (radially away from the station $60_1$), the phase of the 10 Khz waveform supplied by the divider 14 will slip with respect to the 10 Khz feedback, or reference wave corresponding to the divided output of the reference oscillator 70. Correspondingly, if the vehicle has a component of motion in a direction toward the transmitter $60_1$, the output of the divider circuit 14 will advance in phase relative to the 10 Khz waveform present at the circuit point 50.

In accordance with the basic aspects of the present invention, composite phase locked loop circuitry 20 operates to maintain the 10 Khz feedback wave present at the circuit point 50 in a predetermined phase relationship with the wave supplied by the output of the divider network 14, this latter waveform varying in phase as the vehicle moves through the grid with a component of motion normal to the transmitter $60_1$. To accomplish this, a phase comparator 34 provides an analog output at a circuit point 53 which varies in amplitude with the relative phase relationship between the two input 10 Khz waves. When the vehicle moves in a direction away from the station $60_1$, the analog output voltage of the phase comparator 34 causes the pulse adding-deleting circuit 23 to delete a pulse in the train supplied by the oscillator 70. This introduces a corresponding lag in the phase of the 10 Khz waveform at circuit point 50, thereby bringing the waveforms at the points 50 and 51 back into substantial synchronization (phase lock). Correspondingly, if the vehicle has a component of motion toward the station $60_1$, an opposite change in the output of the phase comparator 34 causes the pulse adding/deleting circuit 23 to add an extra pulse into the train supplied by the oscillator 70 to advance the phase of the feedback 10 Khz oscillation (circuit point 50) to again maintain the predetermined phase relationship between the two 10 Khz waveforms.

Signals representative of the added and deleted pulses produced by action of the circuit 23 are respectively supplied to the "down" and "up" count inputs of an up-down counter 48. The counter 48 is initially preset either to a cleared condition, or to a known value corresponding to the starting point of the vehicle. Each pulse added to the pulse train of the oscillator 70 by the circuit 23 (corresponding to a single up count being registered in the counter 48) signals that the vehicle has moved a distance of 98.4 feet toward the station $60_1$, while each down count signals a like displacement away from the station. The net contents of the counter 48 is then a direct measure of distance moved in the direction normal to the transmitter 60, and is either absolute position information if the counter is preloaded with starting point information, or relative displacement information if the counter starts from a cleared state. The absolute 98.4 feet measure (independent of carrier frequency) follows from the 98,400 foot wave length of 10 Khz signal, divided by 1000 to reflect the fact that each pulse is scaled down by a factor of 1000 in the divider 22 as to its relative bearing in forming the 10 unambiguously output of this counter.8c Absolute position of the vehicle may thus be completely and unambiguously determined from the outputs of the counter 48 in each of the channels 1–3. The vehicle's position may be determined from tables supplied to a user, or may simply be communicated back to a central station, as by any multiplex communication apparatus, for position determination, or entry into data processing apparatus for automated scheduling and/or display applications. The central station may also make such corrections as are required for drifts in the carrier frequency of the monitored AM stations.

The particular operation of the circuit elements effecting the above mode of system operation will now be considered. The phase comparator 34 may in a simple form thereof simply comprise an Exclusive OR gate 36 having its output supplied to an integrator or low pass filter 38. FIGS. 3A and 3B depict one predetermined relationship for the phase locked conditions of the two 10 Khz signals at the circuit points 50 and 51 of FIG. 1, viz., disposed 90° apart. The output of the Exclusive OR circuit 36, high when one and only one of the two inputs is high, is shown in FIG. 3C. The integrator 38 provides an output DC voltage proportional to the average value of the waveform of the Exclusive OR output wave shown in FIG. 3C, and corresponds to the value $a$ in the phase comparator transfer characteristic shown in FIG. 4. This precise locked condition is also indicated by the line 57 at the 90° point in FIG. 4.

With reference to FIGS. 3A, 3D and 3E, it will be seen that the average value, or duty cycle at the output of the exclusive OR gate 34 decreases as the vehicle moves toward the station $60_1$, that is, as the received and divided carrier wave at point 51 advances or leads its nominal relative phase shown in FIG. 3B. Accordingly, the analog output of the integrator 38, at circuit point 53, decreases in an amount directly proportional to the amount of the phase of lead (vehicle spatial displacement). Correspondinly, with reference to FIGS. 3A, 3F and 3G, the analog output at circuit point 53 increases as the vehicle moves away from the station, i.e., as the waveform supplied by the divider 14 slips or lags from its quiescent relative phase of FIG. 3B.

As long as the relative phase between the two 10 Khz waves at circuit points 50 and 51 is between the bounds 58 and 59 shown in FIG. 3, the pulse to, circuit 23 is passive, and no pulses are added to or deleted from the pulse train supplied to the counter by the oscillator 70. When the vehicle makes a significant movement radially toward the transmitter $60_1$, i.e., a movement of 98.4 feet, the phase lead exceeds the bound 59 and the output voltage from the comparator 34 at the point 53 falls below the value $b$ shown in the transfer characteristic of FIG. 4. When this condition obtains, a threshold circuit 44, e.g., a Schmitt trigger, switches and presents a relatively high output voltage which enables a gated oscillator 46. The gated oscillator 46, like an oscillator 42 discussed hereinbelow, may comprise any well-known embodiment therefor, e.g., AC coupled logic gates in a gated astable multivibrator configuration, a unijunction transistor or other relaxation oscillator, or the like.

The enabled oscillator 46 supplies an output pulse which flows through a gate 33 for purposes discussed hereinbelow, and through an OR gate 28 and an AND gate 24 to supplement the reference oscillator bit stream. This added pulse advances the phase of the 10 Khz waveform at the circuit point 50 to again bring the two inputs to the phase comparator 34 back into the approximate synchronized relationship of FIGS. 3A and 3B, the phase relationship being within the bounds 58–59 of FIG. 4.

The output pulse from the enabled oscillator 46 and the gate 33 is also supplied to the "down" input count terminal of the counter 48 to reflect the assumed movement of the vehicle toward the station $60_1$. Upon again regaining its proper phase synchronization, the analog output from the comparator returns to the bounds $b - c$ to restore the trigger circuit 44 and shut off the oscillator 46.

Similarly, when the vehicle moves a sufficient distance away from the station, the concomitant phase lag (phase 3A, 3F and 3G) produces an output at the circuit point 53 which exceeds the level of $c$ of FIG. 4 to the corresponding switching threshold of a Schmitt trigger 40. The trigger circuit 40 enables the gated oscillator 42 which supplies a pulse via an AND gate 32 which resets a normally set flip-flop 30. The reset flip-flop 30 serves to delete one pulse supplied by the oscillator 70. That is, the resulting relatively low output voltage at the "1" output of the reset flip-flop 30, acting through a delay element 36, disables the AND gate 24 such that the next following output pulse from the oscillator 70 is prevented from reaching the divider 22. This deleted oscillator pulse is instead employed to again set the flip-flop 30. All subsequent cycles from the oscillator 70 pass through the gates 28 and 24 in the manner described above. Further, the output pulse provided by the enabled oscillator 42 is supplied to the "up" count input of the counter 48 to advance the state of the counter 48 by one, thus signalling a movement of 98.4 feet away from the station 61.

The gates 32 and 33 are provided to block an output from an enabled associated oscillator 42 and 46 during the presence of an output pulse from the oscillator 70 at which time such gated oscillator output pulses would have no effect, or would create a race condition. This inhibiting action is effected by the inverting inputs of the gate 32 and 33 which require a low output from the oscillator 70 to pass the output of the associated oscillator 42 and 46 herethrough. Since the count inputs of the counter 48 receive only pulses which operatively effect an addition or deletion of a pulse in the reference oscillator stream, it is immaterial that one or more outputs from an oscillator 42 and 46 may be suppressed by reason of a high output from the reference oscillator 70 before a pulse addition or deletion operation is executed.

The above arrangement has thus been shown to provide position information for a vehicle by examining the phase of three radio carriers, conveniently those generated by local commercial AM stations. The displacement information generated in the counter 48 of each of three channels may be used in the vehicle, or communicated to a central station to provide relative or absolute position information.

The above described arrangement is merely illustrative of the principles of the present invention. Numerous modifications and adaptations thereof will be readily apparent to those skilled in the art without departing from the spirit and scope of the present invention.

What is claimed is:

1. In combination in displacement computing apparatus for determining displacement information utilizing the phase of a carrier wave, displacement determining apparatus comprising means for selecting said carrier wave, divider means for reducing the frequency of said carrier wave, a reference oscillator, phase locked loop means connected to said divider means and said reference oscillator means, said phase locked loop means including phase comparator means, and pulse adding and deleting means for selectively adding pulses to and deleting pulses from the pulse wave supplied by said reference oscillator, and accumulator means connected to said pulse adding and deleting means.

2. A combination as in claim 1, wherein said phase locked loop further comprises additional divider means connected intermediate said phase comparator means and said pulse adding and deleting means.

3. A combination as in claim 1, wherein said phase comparator supplies an analog output voltage, first threshold means for signalling said pulse adding and deleting means to add a pulse into the pulse wave supplied by said reference oscillator, and second threshold means for signalling said adding and deleting means to delete a pulse from the pulse wave supplied by said reference oscillator.

4. A combination as in claim 1, wherein said carrier wave selecting means includes an additional phase locked loop.

5. A combination as in claim 1, wherein said carrier wave selecting means includes a bandpass filter.

6. A combination as in claim 1, further comprising first and second additional displacement determining apparatus substantially similar to said displacement determining apparatus.

7. A combination as in claim 1 wherein said displacement computing apparatus utilizes at least one additional carrier wave, each of said carrier wave and said additional carrier waves being emitted by spaced commercial radio transmitters, each of said carrier and additional carrier waves and said reference oscillator being characterized by frequencies which are integral multiples of a common base frequency, said displacement computing apparatus comprising additional displacement determining apparatus in one-to-one correspondence with said additional carrier waves.

* * * * *